US008277211B2

(12) United States Patent
Parrinello et al.

(10) Patent No.: US 8,277,211 B2
(45) Date of Patent: Oct. 2, 2012

(54) APPARATUS FOR TRANSFERRING DOSES AND DOSE

(75) Inventors: Fiorenzo Parrinello, Medicina (IT); Alessandro Balboni, Granarolo dell'Emilia (IT); Maurizio Borgatti, Imola (IT); Matteo Camerani, Russi (IT)

(73) Assignee: Sacmi Cooperativa Meccanici Imola Societa' Cooperativa, Imola (B) (IT)

( * ) Notice: Subject to any disclaimer, the term of this patent is extended or adjusted under 35 U.S.C. 154(b) by 1069 days.

(21) Appl. No.: 11/918,433

(22) PCT Filed: Sep. 9, 2005

(86) PCT No.: PCT/IB2005/002674
§ 371 (c)(1),
(2), (4) Date: Feb. 1, 2008

(87) PCT Pub. No.: WO2006/109108
PCT Pub. Date: Oct. 19, 2006

(65) Prior Publication Data
US 2008/0268274 A1    Oct. 30, 2008

(30) Foreign Application Priority Data

Apr. 13, 2005    (WO) .................. PCT/IB2005/000968
Apr. 22, 2005    (WO) .................. PCT/IB2005/001085

(51) Int. Cl.
*B29C 31/06* (2006.01)

(52) U.S. Cl. ............... 425/261; 425/297; 425/348 R; 425/809

(58) Field of Classification Search .............. 425/261, 425/297, 348 R, 809
See application file for complete search history.

(56) References Cited

U.S. PATENT DOCUMENTS

| 2,632,936 | A | * | 3/1953 | Skipper et al. ............... 264/163 |
| 2,894,285 | A | | 7/1959 | Miller |
| 4,336,011 | A | | 6/1982 | George |
| 4,404,229 | A | * | 9/1983 | Treharne ...................... 426/513 |
| 4,979,282 | A | | 12/1990 | Alieri et al. |
| 5,807,592 | A | * | 9/1998 | Alieri ........................... 425/347 |
| 6,349,838 | B1 | | 2/2002 | Saito et al. |
| 6,582,215 | B2 | * | 6/2003 | Cloutier ........................ 425/140 |

(Continued)

FOREIGN PATENT DOCUMENTS
EP    568 823    11/1993
(Continued)

OTHER PUBLICATIONS

Office Action (with English translation) in JP 2008-505971 mailed Feb. 1, 2011.

(Continued)

*Primary Examiner* — Yogendra Gupta
*Assistant Examiner* — Joseph Leyson
(74) *Attorney, Agent, or Firm* — Nixon & Vanderhye P.C.

(57) ABSTRACT

An apparatus comprising a transferring element for transferring a dose of flowable material, said dose being provided with an elongated body having a transverse dimension and an end zone, a receiving member for receiving said dose from said transferring element, wherein said transferring element comprising an end-forming arrangement for forming said end zone in such a way as to decrease said transverse dimension in the vicinity of said end zone. A dose of plastics comprises an elongated body provided with a transverse dimension, said elongated body comprising an end zone provided with a respective transverse dimension that is less than said transverse dimension.

28 Claims, 9 Drawing Sheets

U.S. PATENT DOCUMENTS

| | | | |
|---|---|---|---|
| 7,427,195 B2 * | 9/2008 | Balboni et al. | 425/345 |
| 8,007,266 B2 * | 8/2011 | Parrinello et al. | 425/261 |
| 2002/0150647 A1 | 10/2002 | Cloutier | |
| 2011/0280981 A1 * | 11/2011 | Parrinello et al. | 425/348 R |

FOREIGN PATENT DOCUMENTS

| | | |
|---|---|---|
| EP | 1 110 642 | 6/2001 |
| EP | 1 193 054 | 4/2002 |
| EP | 1 361 000 | 11/2003 |
| JP | 03 169605 | 7/1991 |
| JP | 2003 039531 | 2/2003 |
| JP | 2003 127211 | 5/2003 |
| JP | 2004 276371 | 10/2004 |
| JP | 2005-059240 | 3/2005 |
| WO | WO 2004039553 A1 * | 5/2004 |
| WO | 2005/007378 | 1/2005 |
| WO | 2005/102641 | 11/2005 |

OTHER PUBLICATIONS

Letter from Japanese associate dated Mar. 1, 2011 forwarding Office Action dated Feb. 1, 2011.

PCT International Search Report mailed Apr. 24, 2006, PCT/IB2005/002674.

International Preliminary Report on Patentability dated Apr. 24, 2006, PCT/IB2005/002674.

* cited by examiner

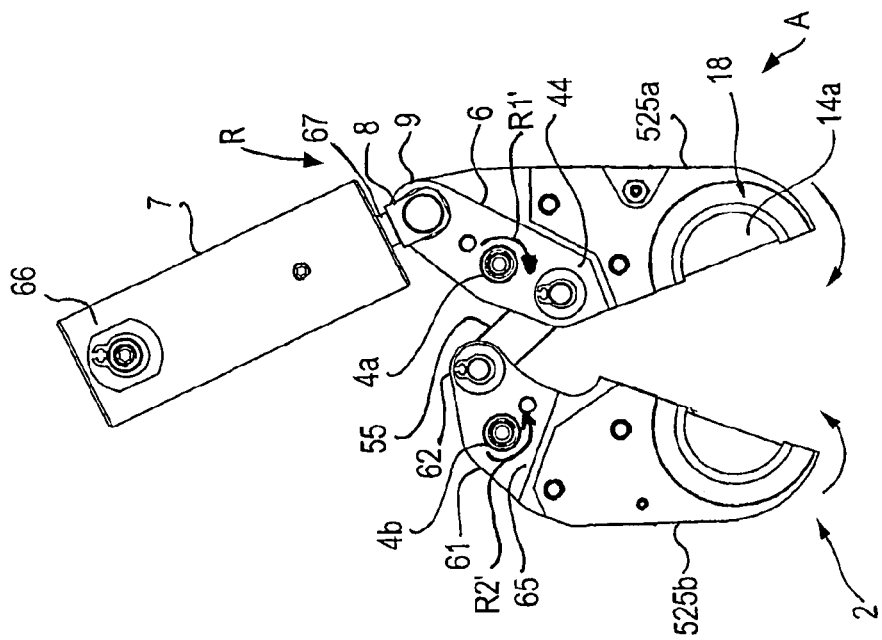
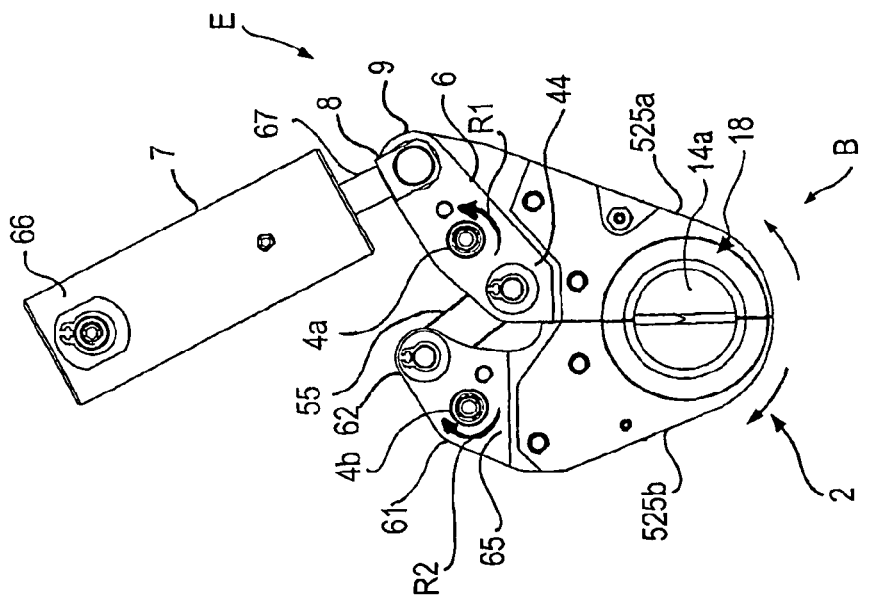

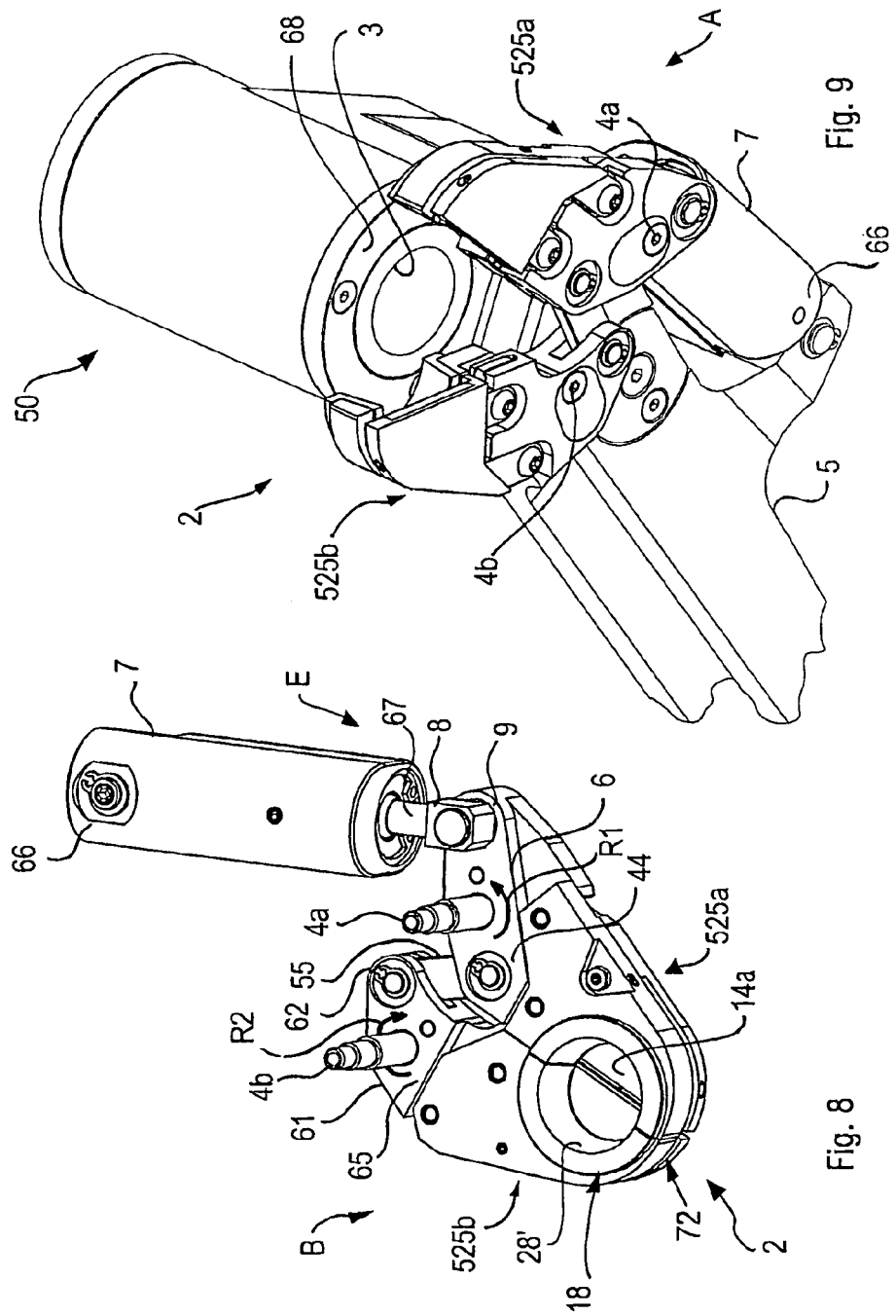

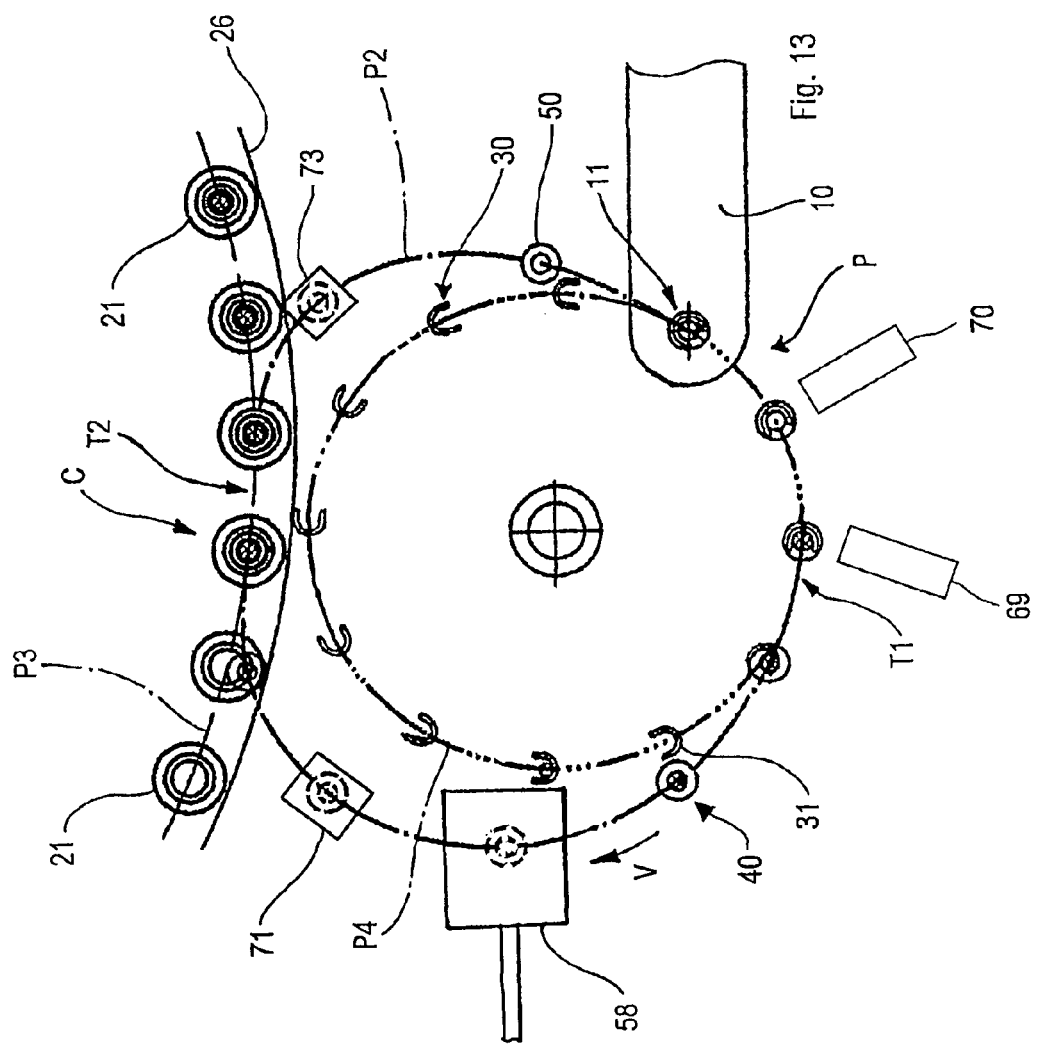

APPARATUS FOR TRANSFERRING DOSES AND DOSE

This application is the U.S. national phase of International Application No. PCT/IB2005/002674 filed 9 Sep. 2005 which designated the U.S. and claims priority to PCT/IB2005/000968 filed 13 Apr. 2005 and PCT/IB2005/001085 filed 22 Apr. 2005, the entire contents of each of which are hereby incorporated herein by reference.

The invention relates to an apparatus for transferring a dose of plastics to a forming device to form a preform from which it is possible to obtain a container, in particular a bottle. The invention furthermore relates to a dose from which it is possible to obtain said preform.

BACKGROUND

Apparatuses are known for compression-moulding objects in plastics, for example caps for bottles, comprising a rotating moulding carousel that carries a plurality of moulds each comprising a die and a punch. During rotation, each die receives a dose of plastics in a highly viscous liquid state. The dose is pressed between the die and the respective punch over a circumference arc travelled by the moulding carousel. The pressing step is followed by opening of the mould and extraction of the moulded object from the apparatus.

Each dose is dispensed by an extruding device with which a transfer device is associated, which device also has the shape of a carousel, comprising a plurality of removing elements that successively remove the doses dispensed by the extruding device and transfer them to the moulding carousel.

The plastics that constitute the doses tend to adhere to the surfaces with which they come into contact, due to the physical state of the highly viscous liquid. The adhesive properties of the plastics make it difficult to transfer the dose, which can adhere to the walls of the die, especially if the dose is dropped through gravity into the die. This defect is particularly noticeable if doses of the type used to obtain preforms have to be transferred. Such doses in fact comprise a quantity of the plastics greater than the doses required to mould caps and normally have an elongated shape. The dies in which the preforms are shaped are provided with a relatively narrow and deep cavity and the dose may be unable to position itself correctly inside the die cavity because it adheres to the walls of the cavity before reaching the bottom thereof. This produces unequal distribution of the plastics in the cavity, which may cause defects in the preform and therefore in the bottle.

Furthermore, a portion of dose may even remain outside the cavity of the die, protruding therefrom and preventing the die and the punch from pressing against each other during the moulding phase. This may cause not only the production of rejects and an arrest of the production cycle to clean the reject material off the mould but also possible damage to the mould and to its driving device.

Known apparatuses are thus not suitable for processing doses of relatively large dimensions such as for example the doses for obtaining preforms for bottles.

SUMMARY

An object of the invention is to improve the apparatuses for transferring doses of flowable material, particularly in compression-moulding of plastics.

Another object is to provide an apparatus that enables doses to be transferred, in particular doses of plastics, to a receiving member comprising, for example, a moulding device, by correctly positioning the doses in the receiving member, even when the doses have a relatively high volume and a relatively complex shape.

A further object is to provide an apparatus for transferring doses in a controlled manner to a receiving member, comprising for example a moulding device.

Another object is to provide an apparatus for transferring doses, in particular plastics, that can be driven in a simple manner.

Still another object is to provide a dose of plastics that can be easily moved and positioned even when the dose has a relatively great volume and a relatively complex shape.

In a first aspect of the invention, there is provided an apparatus comprising:
 a transferring element for transferring a dose of flowable material, said dose being provided with an elongated body having a transverse dimension and an end zone;
 a receiving member for receiving said dose from said transferring element;
said transferring element comprising an end-forming arrangement for shaping said end zone in such a way as to decrease said transverse dimension near said end zone.

In a second aspect of the invention, there is provided a dose of plastics comprising an elongated body provided with a transverse dimension, wherein said elongated body comprises an end zone provided with a respective transverse dimension that is less than said transverse dimension.

Owing to the first and second aspect of the invention, it is possible to obtain doses of plastics having an end zone the shape of which is geometrically defined by the end-forming arrangement. In particular, the end-forming arrangement decreases the transverse dimension of the dose near the end zone, they namely model the end zone in such a way that the dose can easily enter the inside of the receiving member, which may comprise a die cavity.

In fact, when the dose is released by the transferring element inside the die cavity, the end zone of the dose easily penetrates the die cavity without substantially adhering to the side walls of the cavity. The descent of the entire elongated body into the die cavity is thus facilitated. This is especially useful if the die cavity is relatively deep or narrow in relation to the volume of the dose and/or the operating speeds of the apparatus are relatively high.

In a third aspect of the invention, there is provided an apparatus comprising:
 a transferring element for transferring a dose of flowable material;
 a receiving member for receiving said dose from said transferring element;
wherein said transferring element comprises a first closing member cooperating with a second closing member to close and/or open an opening obtained in said transferring element and which is traversable by said dose.

Owing to the first closing member and to the second closing member it is possible to control in an effective manner the transfer of the dose from the transferring element to the receiving member, which may in particular comprise a die cavity.

In a version, the first closing member and the second closing member are driven by the same driving device. Owing to this version, it is possible to control in a simple and substantially simultaneous manner the first closing member and the second closing member.

In a fourth aspect of the invention, there is provided an apparatus comprising:
 a transferring element movable along a path and provided with a housing to house a dose of flowable material;

a receiving member for receiving said dose from said transferring element;

wherein it further comprises a sensor arrangement for detecting said dose in said transferring element.

Owing to the fourth aspect of the invention, it is possible to check that the dose travels along the housing and that it can therefore transfer to the receiving member in an effective manner and in an expected time.

BRIEF DESCRIPTION OF DRAWINGS

The invention can be better understood and implemented with reference to the enclosed drawings, that illustrate some embodiments thereof by way of non-limitative example in which:

FIG. 6 is a plan view of a closing device included in the first transferring element, in a closing configuration;

FIG. 7 is a plan view of the closing device in FIG. 6 in an opening configuration;

FIG. 8 is a perspective view from above of the closing device in FIG. 6, in the closing configuration;

FIG. 9 is a perspective view from below of the first transferring element provided with the closing device in FIG. 6, in the opening configuration;

FIG. 13 is a schematic and enlarged plan view showing a sensor arrangement of the apparatus in FIG. 1.

DETAILED DESCRIPTION

Figure 1:
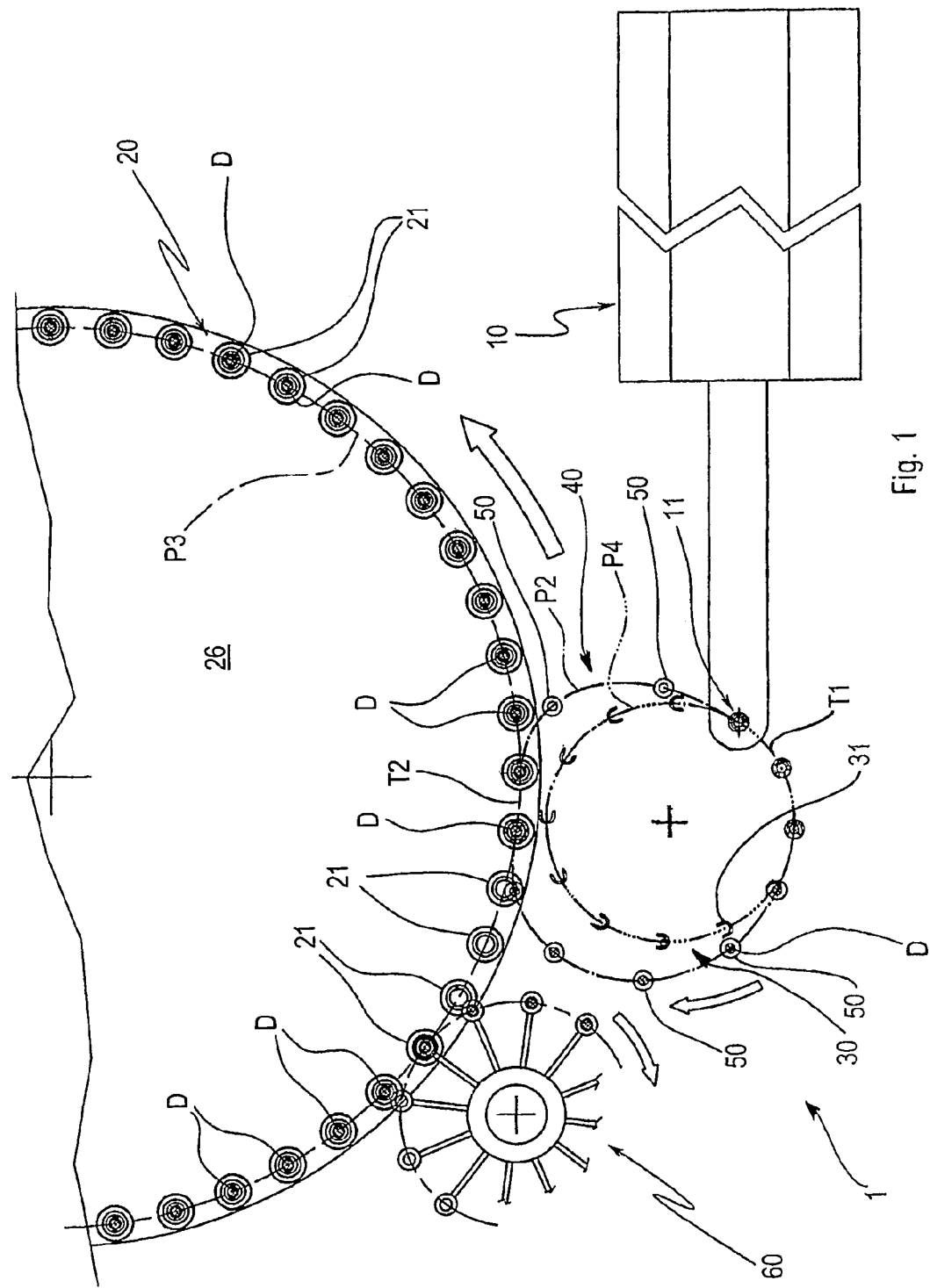
FIG. 1 is a schematic plan view of an apparatus comprising a transferring element for transferring doses of plastics to a moulding device.

FIG. 1 shows an apparatus 1 for transferring doses D of plastics, for example polyethyleneterephthalate (PET), to a moulding device 20 for forming preforms, from which it is possible to obtain containers, for example bottles, by means of stretch-blow moulding.

The doses D are dispensed by a dispensing device 10 comprising a plastics extruder, provided with a outlet 11 from which plastics in a highly viscous liquid state exit. A cutting device is provided, that is not shown, for cutting the plastics exiting from the outlet 11 so as to define the doses D.

The moulding device 20 comprises a carousel 26 rotatable around a vertical axis and supporting a plurality of moulds each comprising a die 21 and a punch that is not shown. Each die 21 comprises a lower part in which a cavity is obtained with a substantially cylindrical shape having a curved bottom and an upper part having a through hole provided with radial projections suitable for forming a neck of the platform provided with undercuts, for example threading. The upper part is divided into at least two movable parts that are moved away from one another when the preform is extracted from the die 21.

Each punch interacts with the corresponding die 21 to form an internal surface of the preform during a moulding step. In this phase, the punch is arranged inside the cavity of the corresponding die 21 for compression-moulding the dose D previously transferred to the cavity of the die 21.

The apparatus 1 furthermore comprises an extracting device 60 for removing the preforms from the corresponding moulds and moving them away from the moulding device 20.

To transfer the doses D from the outlet 11 to the cavities of the dies 21, the apparatus 1 comprises a first transferring arrangement 40 and second transferring arrangement 30.

The first transferring arrangement 40 comprises a plurality of transferring chambers 50 movable in a substantially continuous manner along a loop path P2. As shown in FIG. 13, along the loop path P2 it is possible to define a removing position P, in which each transferring chamber 50 receives a dose D from the second transferring arrangement 30, and a delivery position C, in which the transferring chamber 50 releases the dose D in a die 21 underneath.

Figure 2:
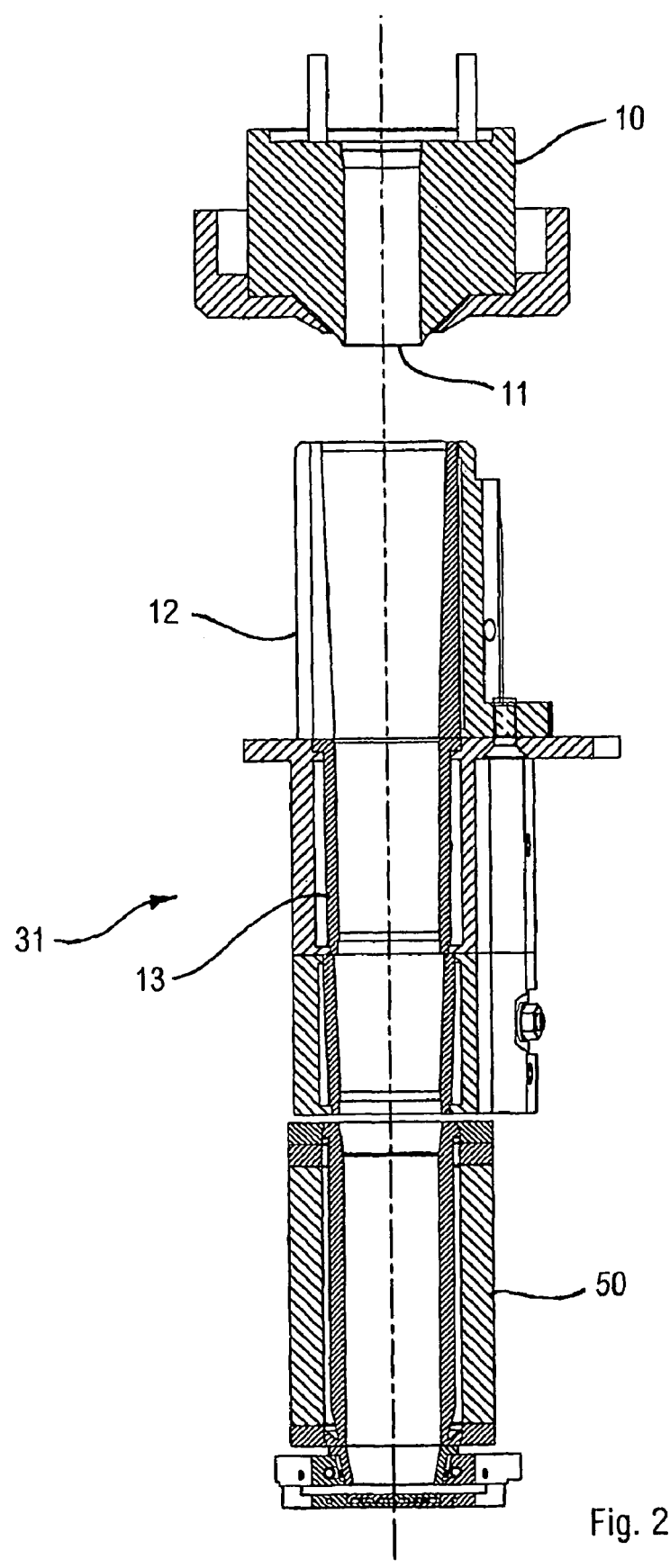
FIG. 2 is a section of the transferring element of the apparatus in FIG. 1, taken along a longitudinal axis of the transferring element.

The second transferring arrangement 30 comprises a plurality of transferring elements 31, each of which, as shown in FIG. 2, is provided with an upper portion 12 having a "U" shape or "C" shape in such a way as to define a channel open on one side. Each transferring element 31 furthermore comprises a funnel portion 13 arranged below the upper portion 12.

The transferring elements 31 are fitted to a respective carousel rotatable around a vertical rotation axis and are therefore movable in a substantially continuous manner along a circular path P4, arranged at a higher level than the loop path P2 of the first transferring arrangement 40. As shown in FIG. 1, it is possible to identify a first portion T1 in which the circular path P4 substantially coincides with the loop path P2. The loop path P2 is at a higher level than a further circular path P3 along which the dies 21 and the corresponding punches move. It is possible to identify a second portion T2 in which the loop path P2 substantially coincides with the further circular path P3.

During operation, the cutting device separates a dose D from the plastics exiting from the outlet 11 of the dispensing device 10. The dose D is removed by a transferring element 31 that passes below the outlet 11. Whilst the transferring element 31 moves along the circular path P4, the dose D descends through gravity inside the upper portion 12 and therefore inside the funnel portion 13. Along the first portion T1, the transferring element 31 moves by keeping itself in a position that is substantially coaxial to a transferring chamber 50 underneath, as shown in FIG. 2, so that the dose D moves from the transferring element 31 to inside the transferring chamber 50 underneath. The funnel portion 13 ensures that the dose D is centred correctly in the transferring chamber 50. The dose D is transported from the transferring chamber 50 along the loop path P2 until it reaches the second portion T2. In this portion, the transferring chamber 50 moves by keeping itself above a corresponding die 21 and the dose D has at its disposal a sufficient period of time to descend into the die 21.

In a version that is not shown, the transferring elements 31, each comprising the upper portion 12 and the funnel portion 13, can be fixed to the transferring chambers 50 underneath. In this case, the transferring elements 31 do not move along the circular path P4, but move along the loop path P2 together with the respective transferring chambers 50. It is possible to provide a jet of pressurised fluid, for example compressed air, to facilitate the descent of the dose D inside the assembly formed by the transferring element 31 and by the transferring chamber 50.

Figure 3:
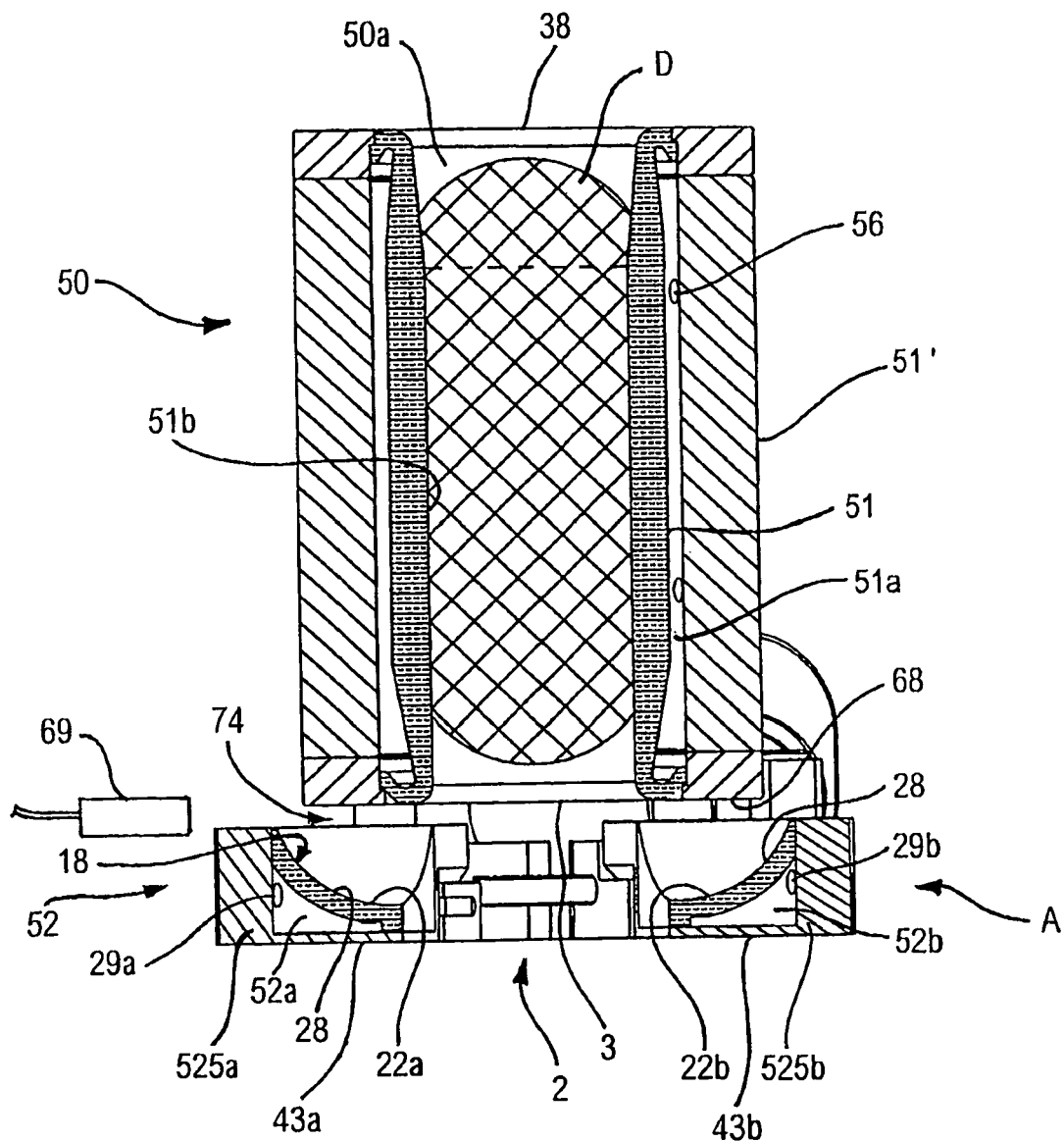
FIG. 3 is a section taken along a longitudinal plane of a first transferring element included in the apparatus in FIG. 1 and provided with an end-forming arrangement suitable for shaping an end zone of a dose.

As shown in FIG. 3, each transferring chamber 50 comprises a side wall 51 internally delimited by an internal surface 51*b* that defines an internal cavity or housing 50*a* in which the dose D can be received. The internal surface 51*b* is substantially cylindrical and may have a diameter that is not greater than the diameter of the die cavity 21.

The transferring chamber 50 is delimited below by a lower base wall 52.

The lower base wall 52 is not a single body but consists of two elements, namely a first closing element 525*a* and a second closing element 525*b*, that are rotatable in relation to the side wall 51 around respective vertical axis pivots fixed to the wall 51. The two elements 525*a*, 525*b* rotated to close against each other, close the outlet of the chamber 50 and form the lower base wall 52 which, as will be explained below, may be porous. On the other hand, the two elements 525*a*, 525*b* rotated to the outside when open, enable the dose D to exit from the transferring chamber 50.

The first closing element 525*a* and the second closing element 525*b* thus act as a closing device 2 to selectively close or open an opening 3 arranged in a lower region of the transferring chamber 50 and surrounded by the side wall 51. The first closing element 525*a* and the second closing element 525*b* are movable between an opening configuration A and a closing configuration. In the opening configuration A, shown in FIG. 3, the first closing element 525*a* and the second closing element 525*b* are spaced apart from one another to enable the dose D to exit from the transferring chamber 50 through the opening 3 to enter a die 21 underneath. In the closing configuration, the first closing element 525*a* and the second closing element 525*b* are brought near each other to close the opening 3 and prevent the dose D from exiting the transferring chamber 50. In the closing configuration, the first closing element 525*a* and the second closing element 525*b* define the lower base wall 52 of the transferring chamber 50.

On the closing device 2, an end-forming arrangement 18 is obtained to shape an end zone 19 of the dose in such a manner as to confer to the end zone 19 a form that facilitates the exit of the dose from the transferring chamber 50 and the entry of the dose into the die 21. The end-forming arrangement 18 comprises a first forming wall 22*a* obtained on the first closing element 525*a* and a second forming wall 22*b* obtained on the second closing element 525*b*. The first forming wall 22*a* and the second forming wall 22*b* are symmetrical in relation to a plane containing a longitudinal axis of the transferring chamber 50.

Figure 10:
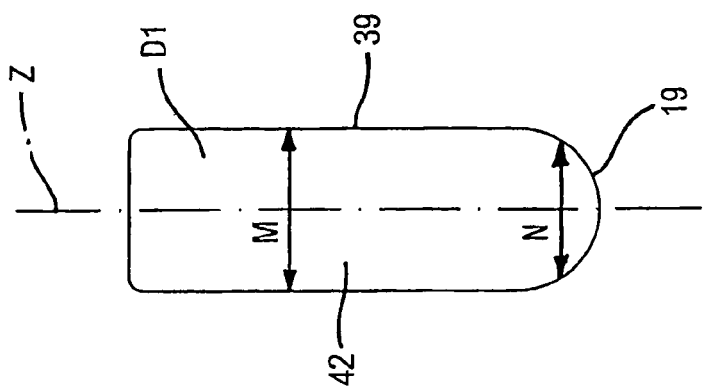
FIG. 10 is a schematic side view of a dose of plastics obtainable with the end-forming arrangement in FIG. 3.

The first forming wall 22*a* and the second forming wall 22*b* are delimited by respective concave surfaces 28 that can be shaped as portions of spherical surfaces. When the first forming element 525*a* and the second forming element 525*b* are in the closing configuration, the concave surfaces 28 define on the lower base wall a recess having the shape of a spherical cover. Owing to its highly viscous liquid state, coming into contact with the end-forming arrangement 18, the dose in the end zone 19 takes on the form of a recess defined in the closing device 2 by the first forming wall 22*a* and by the second forming wall 22*b*. In this way a dose D1 is obtained like the one shown in FIG. 10.

The dose D1 comprises an elongated body 39 with a substantially cylindrical shape that extends along a longitudinal axis Z. The elongated body 39 has, in its central portion 42, a transverse dimension M measured transversely to the longitudinal axis Z and in particular perpendicularly to said axis. In the specific case of FIG. 10, the transverse dimension M is the diameter of the elongated body 39. The end zone 19 delimits the elongated body 39 in a region of the elongated body 39 intended to first enter the die 21. The end zone 19 is externally delimited by a curved and convex surface that may substantially have the shape of a spherical cover. The end zone 19 has a respective transverse dimension N, measured transversely to the longitudinal axis Z, less than the transverse dimension M of the elongated body 39. In particular, the respective transverse dimension N decreases along the longitudinal axis Z, moving away from the central portion 42 of the elongated body 39. In other words, the end-forming arrangement 18 gives the dose D1 a form in which the end zone 19 progressively narrows as it moves away from the central portion 42 of the elongated body 39. Owing to this form, the dose D1 can easily exit from the transferring chamber 50 and, through the opening 3, enter the die 21 below. In fact, the end zone 19 can descend into the die 21 without touching the walls that internally delimit the cavity of the die 21 and help the central portion 42 to position itself correctly, by guiding the central portion 42 whilst the latter enters the die 21.

Figure 4:
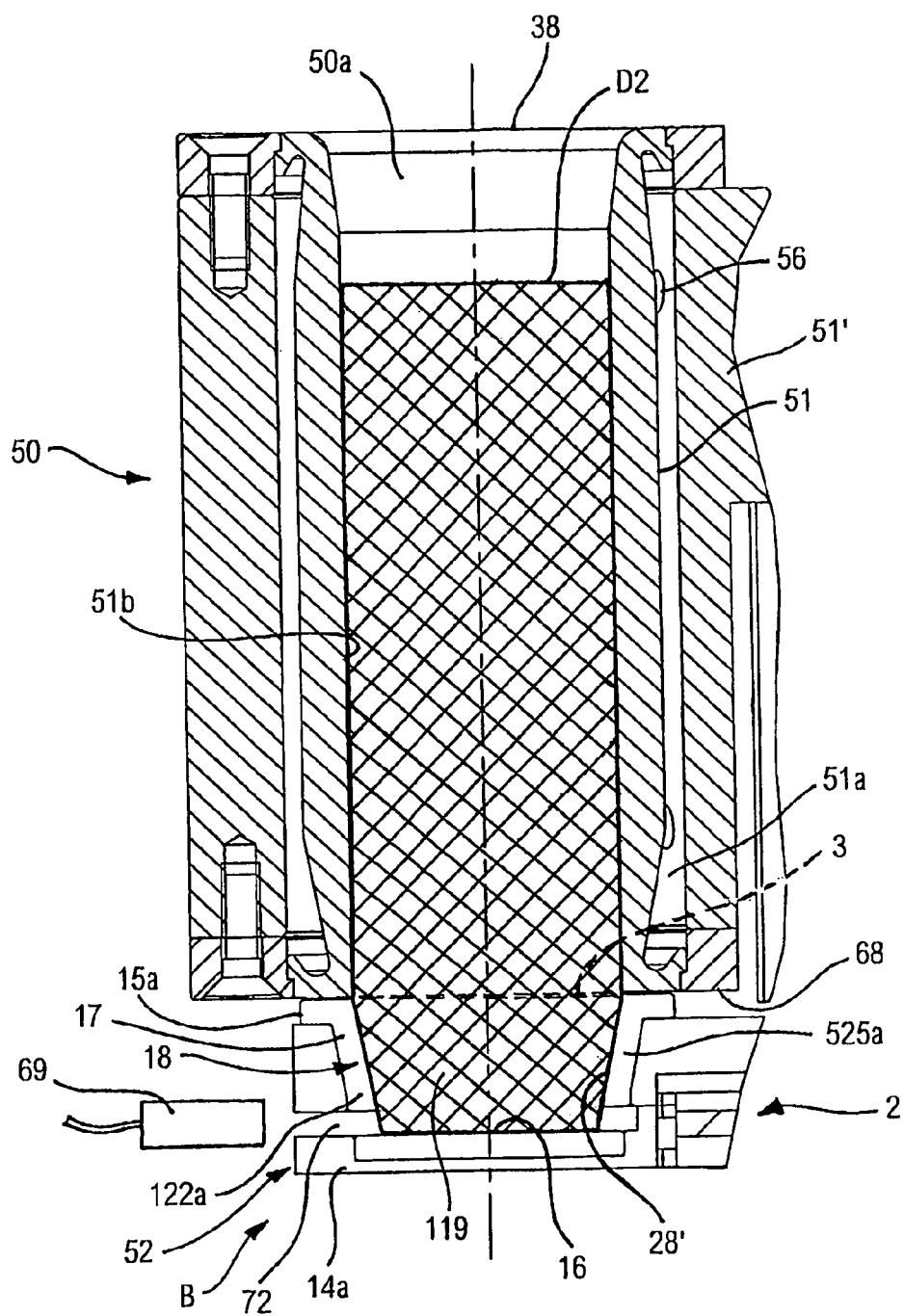
FIG. 4 is a section taken along a further longitudinal plane, substantially orthogonal to the longitudinal plane in FIG. 3, illustrating an alternative version of the end-forming arrangement.

An alternative version of the end-forming arrangement 18 is shown in FIG. 4 in which the closing device 2 is in the closing configuration, which is indicated by B. FIG. 4 is a section taken along a longitudinal plane perpendicular to the further longitudinal plane along which the section of FIG. 3 is taken. Accordingly, in FIG. 4 only the first closing element 525*a* is visible. The second closing element 525*b* has a structure that is completely similar to what is disclosed below with reference to the first closing element 525*a*.

The first closing element 525*a* comprises a first base portion 14*a* and a first side portion 15*a*, interposed between the side wall 51 and the first base portion 14*a*. The first side portion 15*a* is provided with a recess internally delimited by a first forming wall 122*a* having the shape of a half of a frustum cone. In the closing configuration B in which the first closing element 525*a* is in contact with the second closing element 525*b*, the first base portion 14*a* and a corresponding second base portion obtained on the second closing element 525*b* define the lower base wall 52, delimited above by a flat surface 16 that frontally shapes the dose. In the closing configuration B, the first side portion 15*a* and a corresponding second side portion obtained on the second closing element 525*b* define an annular body 17 provided with a central passage traversable by the dose. This passage is internally delimited by a frustum-conical shaped surface 28'. The frustum cone has a larger base facing the housing 50*a* and a smaller base facing the lower base wall 52.

The first base portion 14*a* is separated from the first side portion 15*a* so that, in the closing configuration B, between the annular body 17 and the lower base wall 52 it is possible to define a gap 72.

Figure 11:
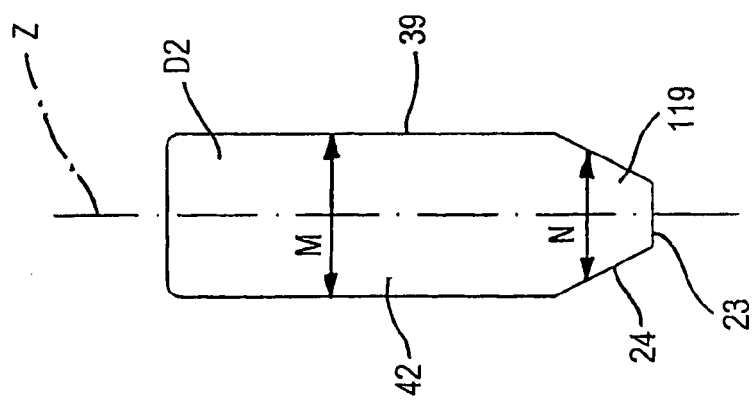
FIG. 11 is a view like the one in FIG. 10, showing a dose obtainable with the end-forming arrangement in FIG. 4.

The end-forming arrangement 18 shown in FIG. 4 enables a dose D2 to be obtained as shown in FIG. 11. The dose D2 comprises an end zone 119 frontally delimited by a transverse surface 23 that is substantially flat in shape. The transverse surface 23 is arranged transversely, and more particularly perpendicularly, to the longitudinal axis Z and is shaped by the flat surface 16 of the end-forming arrangement 18 when the dose D2 is inside the transferring chamber 50. The end zone 119 is laterally delimited by a frustum-conical surface 24 that has been shaped by the surface 28' of the end-forming arrangement 18.

The end zone 119 has a respective transverse dimension N that is less than the transverse dimension M of the central portion 42 and that decreases in a substantially linear manner by moving away along the longitudinal axis Z from the central portion 42.

Figure 5:
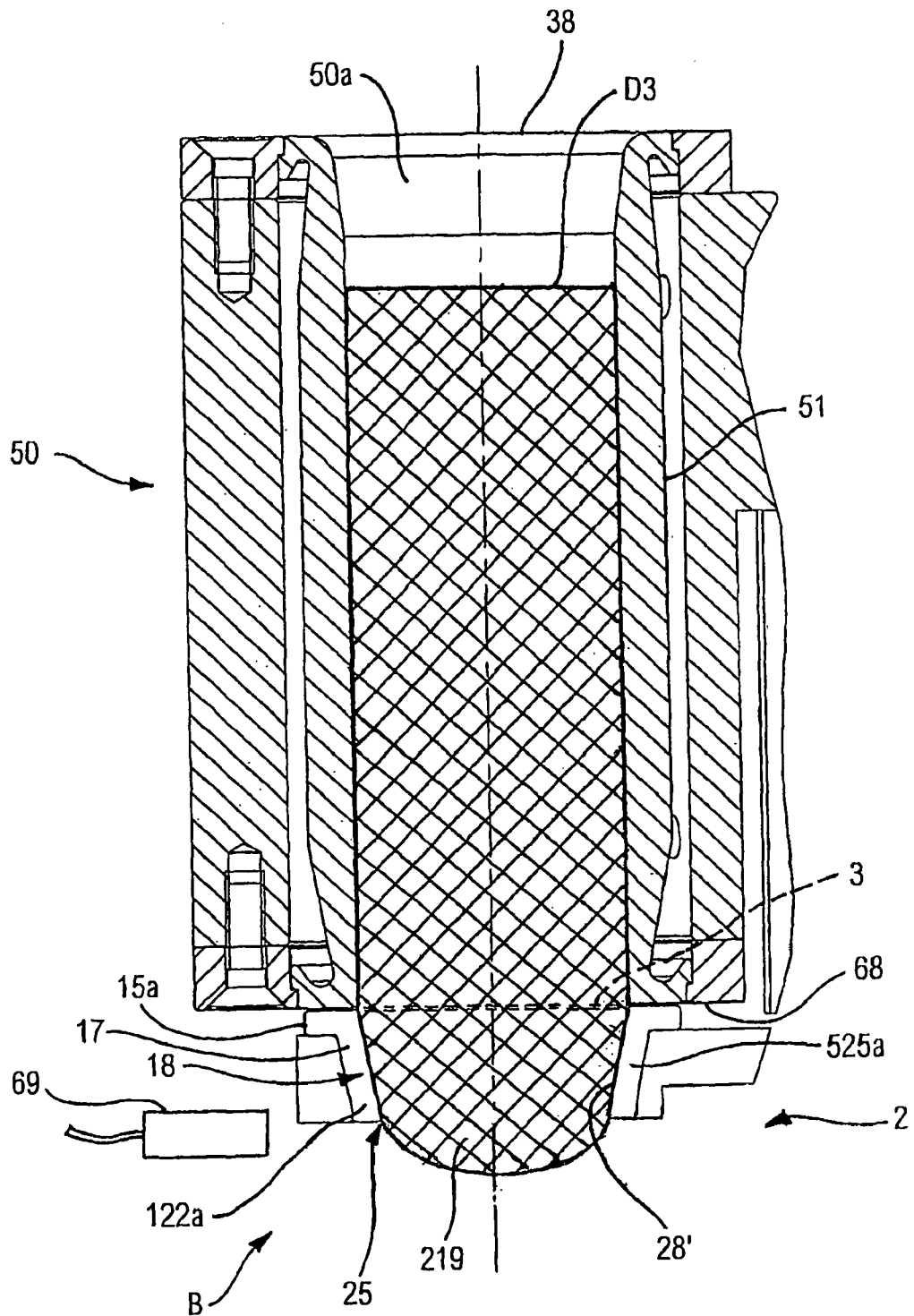
FIG. 5 is a section like the one in FIG. 4, showing another alternative version of the end-forming arrangement.

In another alternative version of the end-forming arrangement 18, shown in FIG. 5, the first closing element 525a is provided with the first side portion 15a but does not comprise the first base portion 14a. Similarly, the second closing element 525b is devoid of the second base portion. Therefore, in the closing configuration B, between the first transferring element 525a and the second transferring element 525b a further opening 25 is defined that is arranged below the opening 3 of the housing 50a.

Figure 12:
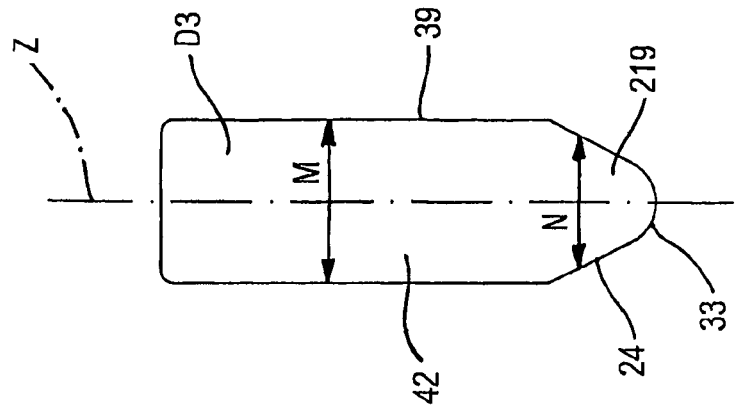
FIG. 12 is a view like the one in FIG. 10, showing a dose obtainable with the end-forming arrangement in FIG. 5.

The end-forming arrangement 18 shown in FIG. 5 enables a dose D3 to be obtained of the type shown in FIG. 12. The dose D3 comprises an end zone 219 laterally delimited by a frustum-conical surface 24 as in the case of FIG. 11. Nevertheless, unlike the dose D2 shown in FIG. 11, the dose D3 in FIG. 12 is not delimited, transversely to the longitudinal axis Z, by a substantially flat transverse surface. On the other hand, the dose D3 is delimited, transversely to the longitudinal axis Z, by a rounded surface 33.

Inside the transferring chamber 50, the end zone 219 is laterally shaped by the surface 28' so as to take on a frustum-conical shape. Owing to the force of gravity, the end zone 219, not being opposed by the lower base wall 52, tends to flow downwards through the further opening 25. In particular, the portions of the end zone 219 nearest the surface 28', being braked by the friction that is created on contact with the surface 28', move downwards more slowly than the further portions of the end zone 219 nearer to the longitudinal axis Z. In this way, the rounded surface 33 is defined. Owing to its shape, the end zone 219 enables the dose D3 to enter the die 21 very easily. In fact, the quantity of plastics that constitutes the end zone 219 is greater than that which constitutes the end zone 119 of the dose D2 shown in FIG. 11. The quantity of plastics is thus increased, which, owing to the reduced transverse dimensions, can enter the cavity of the die 21 without interfering with the walls that delimit it internally.

It is furthermore noted that, through the further opening 25, it is possible to evacuate the air contained in the transferring chamber 50 whilst the dose D descends to the die 21.

FIGS. 6 to 9 show how the first closing element 525a and the second closing element 525b are driven to go from the opening configuration A to the closing configuration B and vice versa. The first closing element 525a and the second closing element 525b are respectively rotatable around a first pivot 4a and a second pivot 4b. The first pivot 4a and the second pivot 4b extend along respective vertical axes substantially parallel to the side wall 51, in such a way that the first closing element 525a and the second closing element 525b move on a substantially horizontal plane with a pincer-like movement.

To the first closing element 525a a first lever 6 is fixed that is rotatable around the first pivot 4a, which is arranged in a central region of the first lever 6. The first lever 6 is rotatable by an actuator 7 having a head 8 rotatably connected to a first end 9 of the first lever 6. With a second end 44 of the first lever 6 opposite the first end 9 an end of a connecting rod 55 is rotatably connected. A further end of the connecting rod 55 is connected to a second lever 61 fixed to the second closing element 525b. The second lever 61 is rotatable around the second pivot 4b, arranged in a central zone of the second lever 61. The second lever 61 comprises a further first end 62 to which the connecting rod 55 is rotatably connected. A further second end 65 of the second lever 61, opposite the further first end 62, is fixed to the second closing element 525b, for example by screws.

The actuator 7, which may in particular comprise a pneumatic cylinder, is provided with a stem 67 slidable between an extended position E shown in FIGS. 6 and 8, and a retracted position R, shown in FIG. 7. In the extended position E, the stem 67 is outside a cylinder of the actuator 7, whereas in the retracted position R the stem 67 is almost completely inserted inside the cylinder of the actuator 7. By moving from the extended position E to the retracted position R or vice versa, the stem 67 performs a set stroke. The head 8 is connected to the stem 67.

The actuator 7 comprises a terminal part 66, opposite the head 8, rotatably connected to a support 5 provided in the first transferring arrangement 40 to support the transferring chamber 50. In the closing configuration B, the stem 67 is in the extended position E, whereas in the opening configuration A, the stem 67 is in the retracted position R.

When, starting from the closing configuration B, it is desired to move the first closing element 525a and the second closing element 525b away from one another, the actuator 7 moves from the extended position E to the retracted position R. The first lever 6 and the first closing element 525a fixed to it are thus rotated around the first pivot 4a in a direction indicated by the arrow R1 in FIG. 6. Owing to the connecting rod 55, the second lever 61, together with the second closing element 525b, is rotated around the second pivot 4b in a direction indicated by the arrow R2. The first closing element 525a and the second closing element 525b are thus moved away from each other and reach the opening configuration A.

When, starting with the opening configuration A, it is desired to return to the closing configuration B, the actuator 7 moves from the retracted position R to the extended position E, rotating the first lever 6 in a rotation direction R1' opposite the direction R1. Similarly, the second lever 61 is commanded by the connecting rod 55 to rotate in a rotation direction R2' opposite the direction R2. The first closing element 525a and the second closing element 525b are thus brought near each other to shut the opening 3 and return to the closing configuration B in which they prevent the dose D from exiting the transferring chamber 50.

The first closing element 525a and the second closing element 525b move substantially parallel to the opening 3, namely onto a plane parallel to a further plane containing a lower edge 68 of the transferring chamber 50.

Owing to the connecting rod 55, which transmits the movement of the actuator 7 from the first lever 6 to the second lever 61, a single actuator 7 is sufficient to simultaneously drive the first closing element 525a and the second closing element 525b.

Although FIGS. 6 to 9 show a closing device 2 of the type shown in FIG. 4, it is shown how also the closing device of the type shown in FIGS. 3 and 5 can be driven in a similar manner to what has been disclosed with reference to FIGS. 6 to 9.

In a version that is not shown, the first closing element 525a and the second closing element 525b can move between the opening configuration A and the closing configuration B or vice versa translating in relation to each other on a plane parallel to the further plane containing the lower edge 68 of the transferring chamber 50.

In another alternative version that is not shown the first closing element 525a and the second closing element 525b can rotate respectively around a first pivot 4a and a second pivot 4b having respective horizontal axes. In this version, the first pivot 4a and the second pivot 4b are connected to opposite parts of the lower edge 68 and have axes substantially parallel to the plane defined by the lower edge 68. The first closing element 525a and the second closing element 525b each have a movement like a door leaf.

In a further alternative version, that is not illustrated, the first closing element 525a and the second closing element 525b are driven between the opening configuration A and the closing configuration B by an operating fluid rather than by a mechanical system like the one comprising the first lever 6, the second lever 61 and the connecting rod 55.

In a still further version, the apparatus 1 comprises a further closing device, that is not shown, for closing and/or opening an upper opening 38 of the housing 50a. The further closing device may be completely similar to the closing device 2. In this version, when a transferring chamber 50 receives a dose D from the transferring element 31, the further closing device is arranged in an open position so that the dose D, through the top opening 38, can enter the housing 50a. When, on the other hand, the transferring chamber 50 releases the dose D to the die 21, the closing device 2 is arranged in the opening configuration A whereas the further closing device is arranged in a closed position.

As shown in FIGS. 3 to 5, each transferring chamber may comprise an anti-adhesion arrangement to eliminate or at least reduce the adhesion between the plastics constituting the dose D and the surfaces that delimit the housing 50a.

In the version in FIG. 3, the side wall 51 of the transferring chamber 50, the first forming wall 22a and the second forming wall 22b may be porous in such a way as to enable the passage of a fluid through the thickness thereof. A second side wall 51' is provided that is external and coaxial to the side wall 51. The second side wall 51' surrounds the side wall 51 and is joined to it at the upper and lower edges. Between the side wall 51 and the second side wall 51' a side chamber 51a is defined that surrounds the side wall 51 by 360 degrees and substantially extends along the entire height thereof. The side chamber 51a is connected to a supply device, not illustrated in the Figures, that is suitable for sending gas under pressure through inlets 56 into the side chamber 51a and from there through the side wall 51 inside the transferring chamber 50.

In the version shown in FIG. 3, a first external base wall 43a is provided that is placed outside the first forming wall 22a and is joined to it along its own external edge. A second external base wall 43b is placed outside the second forming wall 22b and is joined to it along a respective external edge. Between the first forming wall 22a and the first external base wall 43a a first lower chamber 52a is defined. Similarly, between the second forming wall 22b and the second external base wall 43b a second lower chamber 52b is defined. The first lower chamber 52a and the second lower chamber 52b are provided with further inlets, indicated respectively as 29a and 29b, connected to the supply device.

The pressurised gas is sent by the supply device to the first lower chamber 52a, to the second lower chamber 52b and to the side chamber 51a. From here, the pressurised gas passes through the first forming wall 22a, the second forming wall 22b and the side wall 51, forming a layer of gas that is interposed between the dose D and the internal surface of the transferring chamber 50. This layer of gas enables adhesion between the dose D and the walls 22a, 22b and 51 to be prevented or at least limited.

As an alternative to the porous walls disclosed above, walls of non-porous material may be provided in which numerous small holes are obtained such as to enable the passage of gas through them. According to a further alternative, the porous walls are replaced by a wall obtained by means of a plurality of elements next to one another between which slots are defined that are traversable by the gas.

Also the versions in FIGS. 4 and 5 can be provided with an anti-adhesion arrangement of the type illustrated in FIG. 3, associated with the side wall 51 and/or the first forming wall 122a and with a second forming wall obtained in the second side portion of the second closing element 525b, and/or of the first base portion 14a and of the second base portion.

In an alternative version that is not shown, the anti-adhesion arrangement comprises a cooling device for cooling the side surface 51b and/or the concave surfaces 28 and/or the surface 28' and/or the flat surface 16. The cooling device comprises a conduit arrangement in which a cooling fluid can circulate at a temperature that is lower than the temperature of the dose D. The decrease in the temperature of the side surface 51b and/or of the concave surfaces 28 and/or of the surface 28' and/or of the flat surface 16 reduces the adhesion effect between the dose D and the aforementioned surfaces.

In the versions disclosed above, the dose D drops through gravity from the transferring chambers 50 to the dies 21.

In a version that is not shown, an ejecting device can be provided for facilitating the fall of the dose D from the transferring chambers 50 to the respective dies 21. The ejecting device comprises a blower device that is above and at the transferring chamber 50 when it is aligned on the die 21. After the closing device 2 has been taken to the opening configuration A, the blower device delivers a pressurised fluid, for example air, inside the transferring chamber 50 through the upper opening 38 to push the dose D towards the die 21 underneath.

The apparatus 1 furthermore comprises a sensor arrangement for checking that the dose D is present in the housing 50a and is correctly transferred to the dies 21.

As shown in FIG. 13, the sensor arrangement comprises a sensor 69 arranged in a fixed position on the apparatus 1 near the end of the first portion T1. The sensor 69 checks that the dose D has reached the vicinity of the closing device 2, i.e. that it is ready to be delivered to the die 21.

In the version in FIG. 3, the sensor 69 is positioned along the loop path P2 in such a way that, when a transferring chamber 50 transits in front of the sensor 69, the latter faces a slot 74 interposed between the side wall 51 and the closing device 2. The sensor 69 detects whether the dose D has descended inside the transferring chamber 50 until it reaches a desired position in the slot 74.

In the version in FIG. 4, the sensor 69 is positioned along the loop path P2 in such a way that, when a transferring chamber 50 transits in front of the sensor 69, the latter faces the gap 72 defined between the annular body 17 and the lower base wall 52. The sensor 69 detects whether the end zone 119 of the dose D2 is reached at the gap 72, in a desired position.

In the version in FIG. 5, the sensor 69 is positioned along the loop path P2 at a lower level than the first closing element 525a and the second closing element 525b. When a transferring chamber 50 passes in front of the sensor 69, the latter checks whether the end zone 219 of the dose D3 protrudes underneath the closing device 2 by a desired quantity.

The sensor 69 is thus a position sensor that can check not only whether the end zone of the dose is present in the slot 74 (FIG. 3), or in the gap 72 (FIG. 4), or protrudes below the closing device 2 (FIG. 5), but also that said end zone has reached a desired position in relation to the slot 74 (FIG. 3), or in the gap 72 (FIG. 4), or yet below the closing device 2 (FIG. 5). If the end zone has reached the desired position, the respective dose can be correctly transferred to the die 21 along the second portion T2.

The sensor arrangement can also comprise a further sensor 70 arranged upstream of the sensor 69 in relation to an advance direction V of the transferring chambers 50 along the loop path P2. The further sensor 70 is positioned at a higher level than the sensor 69, i.e. higher than the latter. Also the further sensor 70 is positioned in such a way that, when a transferring chamber 50 transits in front of the further sensor 70, the latter faces the slot 74 (FIG. 3), or the gap 72 (FIG. 4), or again is positioned below the first closing element 525*a* and the second closing element 525*b* (FIG. 5).

When the transferring chamber 50 passes in front of the further sensor 70, the dose, if it is descending correctly inside the transferring chamber 50, may be in a known reference position. Such a position is retracted in relation to the desired position detectable by the sensor 69. If the further sensor 70 detects that the dose is in the reference position, then the dose is descending correctly inside the transferring chamber 50 and the apparatus 1 is operating correctly. If on the other hand the further sensor 70 detects that the dose is further forward or retracted in relation to the reference position, then the dose is moving too fast or too slowly inside the transferring chamber 50. This means that the apparatus 1 is operating in a faulty condition.

The further sensor 70 thus enables any operating faults to be detected even when the sensor 69 detects that the dose can be correctly transferred from the transferring chamber 50 to the die 21. This enables the operator to realise that the apparatus 1 is not operating perfectly, for example because the plastics are deteriorating or because there have been failures of mechanical parts and the apparatus 1 has therefore stopped. As the fault is detected at an early stage when it still does not prejudice the correct transfer of the dose to the die 21, the operator may arrange a normal stop of the apparatus 1 to intervene on the cause of the operating fault.

If there were no sensor arrangement, and in particular the further sensor 70, the operator would realise that the apparatus 1 is not working correctly only when the fault becomes so critical as to jeopardise the correct transfer of the dose into the die 21. It would therefore be necessary to stop the apparatus 1 by following an emergency stop procedure that is more problematic than the normal stop. In fact, whereas with the normal stop the apparatus 1 stops only after processing all the doses already dispensed by the dispensing device 10, in the case of an emergency stop the apparatus 1 stops immediately. The doses already dispensed by the dispensing device 10 and still present in the apparatus 1 must be removed manually, which involves lengthy time losses.

The further sensor 70 may also provide information on how the descent of the doses inside a transferring chamber 50 evolves over time, which may enable any operating parameters to be corrected that unchanged could cause serious faults. For example, if it is detected that the dose moves too slowly inside the transferring chamber 50, a retroactive control arrangement that is not shown can be used to act on the cooling device to decrease the temperature of the cooling fluid in the transferring chamber 50 in question. The temperature decrease of the side surface 51*b* and possibly of the concave surface 28 or of the surface 28' is such as to reduce the effect of adhesion between the dose and said surfaces and improve the descent of the dose inside the housing 50*a*.

The apparatus 1 may comprise a rejecting device 58 to reject any defective dose as the latter is conveyed from the first transferring arrangement 40. The rejecting device 58 is positioned upstream of the delivery position C in relation to the advance direction V of the first transferring arrangement 40. The rejecting device 58 may comprise a pneumatic device, for example provided with at least a nozzle to deliver a jet of pressurised fluid, such as compressed air. If it is desired to reject a faulty dose contained in a transferring chamber 50, the first closing element 525*a* and the second closing element 525*b* of that transferring chamber 50, in the vicinity of the rejecting device 58, are positioned in the opening configuration A. The nozzle of the rejecting device 58 delivers a jet of compressed air above the transferring chamber 50. The jet of compressed air projects the faulty dose outside the transferring chamber 50 through the opening 3. The faulty dose is then removed from the apparatus 1 by a conveying device comprising, for example, a slide.

The sensor arrangement may comprise a presence sensor 71 positioned downstream of the rejecting device 58 in relation to the advance direction V to check whether any faulty dose has been correctly removed from the transferring chamber 50 by the rejecting device 58. The presence sensor 71 is positioned along the loop path P2 at a higher level than the transferring chambers 50, in such a way that each transferring chamber 50 passes periodically below the presence sensor 71. In an alternative version, the presence sensor 71 can be positioned at a lower level than the transferring chambers 50.

The presence sensor 71 is arranged in the vicinity of the rejecting device 58 so that, when a transferring chamber 50 from which a faulty dose has been ejected reaches the presence sensor 71, the first closing element 525*a* and the second closing element 525*b* are still in the opening configuration A. The presence sensor 71 can thus check whether the housing 50*a* is empty, in which case the faulty dose has been correctly rejected or whether the housing 50*a* is still occupied by the faulty dose, in which case the rejecting device 58 has not operated correctly.

The sensor arrangement may also comprise a further presence sensor 73, positioned downstream of the delivery position C in relation to the advance direction V to check that the doses have been correctly delivered by the transferring chambers 50 to the dies 21. The further presence sensor 73 is completely similar to the presence sensor 71 and is positioned along the loop path P2 at an upper level in relation to the transferring chambers 50. In an alternative version, the further presence sensor 73 can be positioned at a lower level in relation to the transferring chambers 50. The further presence sensor 73 is arranged in the vicinity of the delivery position C so that, when each transferring chamber 50 reaches the further presence sensor 73, the first closing element 525*a* and the second closing element 525*b* are still in the opening configuration A. The further presence sensor 73 detects whether the housing 50*a* of each transferring chamber 50 is empty, in which case the respective dose has been correctly transferred to a die 21, or whether a dose is still present in the housing 50*a*. In the latter case, the dose has not been transferred to the die 21 as expected and the apparatus must be stopped to remove the dose from the respective transferring chamber 50.

The invention claimed is:

1. Apparatus comprising:
    a dose transferring element for transferring a dose of flowable material,
    a further dose transferring element for removing said dose from an extruder outlet and transferring said dose to said dose transferring element, and
    a receiving member for receiving said dose from said dose transferring element;
    said dose transferring element being movable along a looped path for transferring said dose; said receiving member being provided in a moulding arrangement for compression moulding a dose of plastics; said dose being provided with an elongated body having a transverse dimension and an end zone; said dose transferring element comprising an end-forming arrangement for forming said end zone in such a way as to decrease said transverse dimension in the vicinity of said end zone.

2. Apparatus according to claim 1, wherein said end-forming arrangement comprises a forming wall surrounding at least partially said end zone when said dose is inside said dose transferring element.

3. Apparatus according to claim 2, wherein said forming wall is internally delimited by a concave surface suitable for interacting with said dose.

4. Apparatus according to claim 3, wherein said concave surface defines on said end-forming arrangement a recess having the shape of a spherical cover.

5. Apparatus according to claim 3, wherein said concave surface defines on said end-forming arrangement a frustum-conical recess.

6. Apparatus according to claim 5, wherein said end-forming arrangement further comprises a substantially flat wall that defines a lesser base of said frustum-conical recess.

7. Apparatus according to claim 5, wherein said end-forming arrangement is axially open so that said frustum-conical recess is a through recess.

8. Apparatus according to claim 1, wherein said dose transferring element comprises a first closing member cooperating with a second closing member to close and/or open an opening obtained in said dose transferring element and traversable by said dose.

9. Apparatus according to claim 1, wherein said receiving member is arranged below said dose transferring element when said dose is delivered to said receiving member.

10. Apparatus according to claim 1, wherein said moulding arrangement is such as to obtain a container preform from said dose.

11. Apparatus according to claim 1, wherein said moulding arrangement comprises a plurality of moulding units fitted to a carousel rotatable around a rotation axis.

12. Apparatus according to claim 11, wherein said rotation axis is substantially vertical.

13. Apparatus comprising:
an extruder for extruding a dose of plastics;
a dose transferring element having an internal cavity for housing said dose, said dose transferring element being movable along a looped path for transferring said dose; and
a receiving member for receiving said dose from said dose transferring element;
said dose transferring element comprising a first closing member cooperating with a second closing member to close and/or open an opening obtained in said dose transferring element and traversable by said dose, said first closing member and said second closing member being driven by a common driving device.

14. Apparatus according to claim 13, said dose being provided with an elongated body having a transverse dimension and an end zone, wherein said dose transferring element comprises an end-forming arrangement for forming said end zone in such a way as to decrease said transverse dimension in the vicinity of said end zone and wherein said end-forming arrangement comprises a first end-forming element obtained in said first closing member and a second end-forming element obtained in said second closing member.

15. Apparatus according to claim 14, wherein said first end-forming element and said second end-forming element are substantially symmetrical with respect to a longitudinal plane of said dose transferring element.

16. Apparatus according to claim 13, wherein said dose transferring element is delimited by side walls each extending along a respective longitudinal axis.

17. Apparatus according to claim 13, wherein said dose transferring element is delimited by side walls each extending along a respective longitudinal axis and said first closing member and said second closing member are translatable on a plane that is transverse to said longitudinal axis.

18. Apparatus according to claim 13, wherein said dose transferring element is delimited by side walls each extending along a respective longitudinal axis and said first closing member and said second closing member are respectively rotatable around a first axis and a second axis.

19. Apparatus according to claim 18, wherein said first axis and said second axis are substantially parallel to each other.

20. Apparatus according to claim 18, wherein said first axis and said second axis are substantially parallel to said longitudinal axis.

21. Apparatus according to claim 18, wherein said first axis and said second axis are substantially orthogonal to said longitudinal axis.

22. Apparatus according to claim 13, wherein said driving device comprises a linear actuator.

23. Apparatus according to claim 13, wherein said driving device is connected to said first closing member, said second closing member being drivable by said first closing member through a connecting rod.

24. Apparatus according to claim 23, wherein said driving device is connected to a first lever fixed to a first closing part of said first closing member.

25. Apparatus according to claim 24, said dose transferring element being delimited by side walls each extending along a respective longitudinal axis, said first closing member and said second closing member being respectively rotatable around a first axis and a second axis, said first lever being rotatable around said first axis by said driving device.

26. Apparatus according to claim 24, wherein said second closing member comprises a second closing part fixed to a second lever.

27. Apparatus according to claim 26, wherein said first lever is rotatably connected to said second lever by said connecting rod.

28. Apparatus according to claim 13, wherein said first closing member and said second closing member are movable between an opening configuration, in which said first closing member and said second closing member are spaced apart from one another to enable said dose to be transferred to said receiving member through said opening, and a closing configuration, in which said first closing member and said second closing member are brought alongside each other to prevent said dose from exiting from said dose transferring element.

* * * * *